June 10, 1969 MASAMI INADA 3,448,835
DISC BRAKE APPARATUS FOR VEHICLES
Filed April 24, 1967
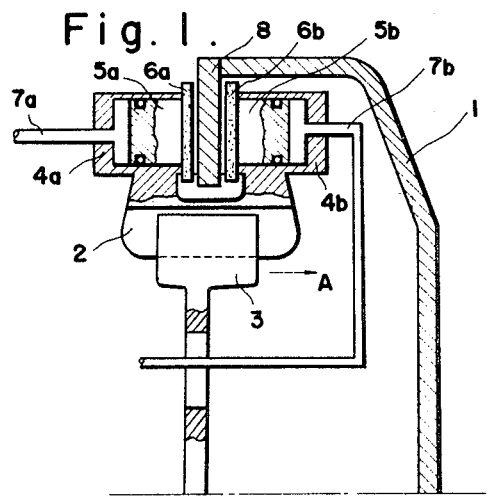
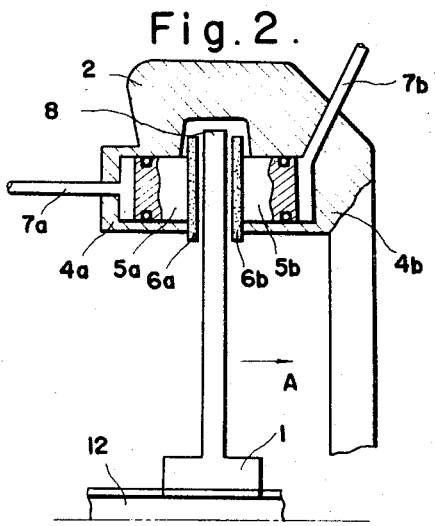
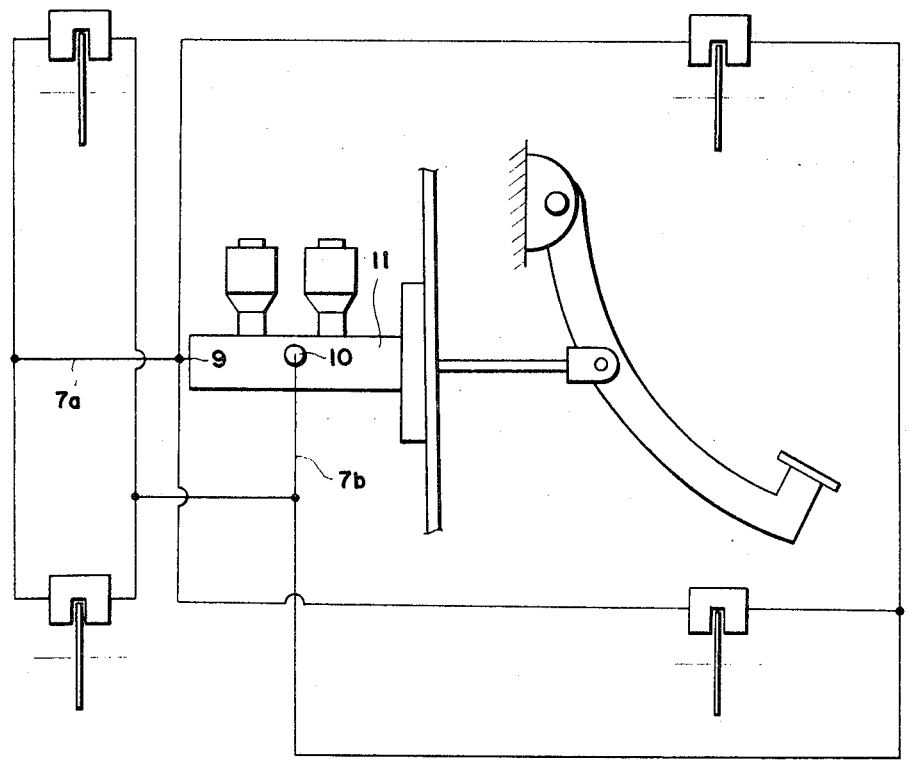
MASAMI INADA, INVENTOR
By Wenderoth, Lind & Ponack, attys.

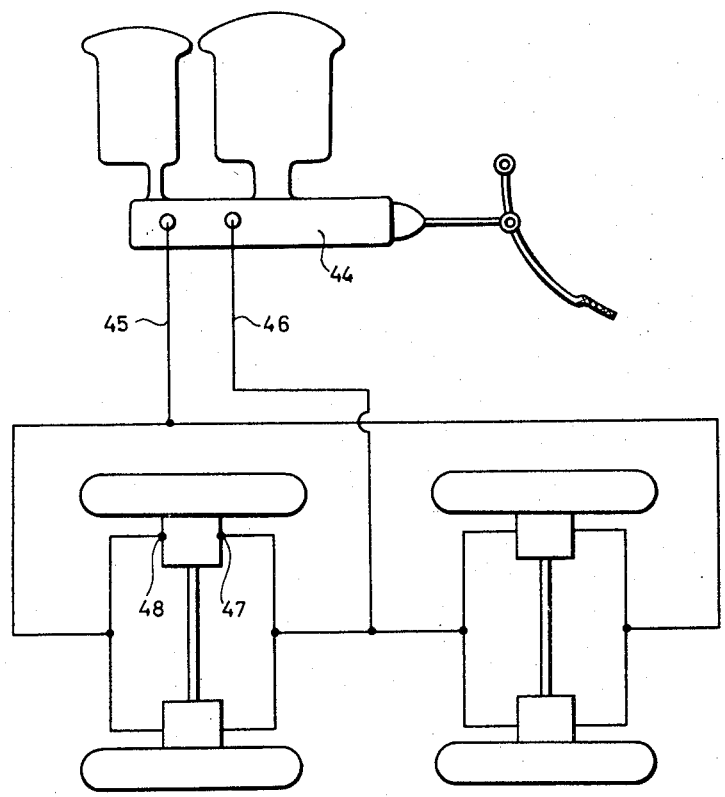

United States Patent Office 3,448,835
Patented June 10, 1969

3,448,835
DISC BRAKE APPARATUS FOR VEHICLES
Masami Inada, Kariya, Japan, assignor to Aisin Seiki Kabushiki Kaisha, Kariya, Aichi Prefecture, Japan
Filed Apr. 24, 1967, Ser. No. 633,091
Claims priority, application Japan, Apr. 23, 1966, 41/25,768, 41/25,769
Int. Cl. B60t *11/10;* F16d *65/38*
U.S. Cl. 188—152   2 Claims

ABSTRACT OF THE DISCLOSURE

This invention relates to a disc brake apparatus for vehicles controlled by means of a dual system of oil pressure circuits provided with an improved arrangement for attaining full braking effect even in case of any trouble or failure of one of the oil pressure circuits, in order to improve safety.

---

In a heretofore proposed brake apparatus controlled by dual system of oil pressure circuits, when any trouble or failure of one of the oil pressure systems occurs another oil pressure system will provide braking action. But, as the braking effect will be reduced to about one-half of the normal braking action, the braking distance is unavoidably increased, so that a dangerous situation would have to be expected. Accordingly, it is an object of the present invention to provide an improved apparatus of the above character, in which one of the dual system oil pressure circuits serves to attain substantially same braking action in case of any trouble or failure of the other oil pressure circuit.

It is another object of the present invention to provide an apparatus of the above character which is inexpensive to manufacture and is ruggedly constructed.

These and other objects of the present invention will become apparent from the following detailed description taken in conjunction with the accompanying drawings wherein:

FIGURE 1 is a sectional view of a disc brake apparatus forming an embodiment of the present invention, in which the means for holding the linings is axially slidable relative to the rigidly mounted brake disc;

FIGURE 2 is a similar sectional view of another embodiment of the invention, in which the brake disc is axially slidable relative to the rigidly mounted lining support;

FIGURE 3 is a diagram of an oil pressure circuit, wherein a dual system master cylinder is used;

FIGURE 6 is a diagram of an oil pressure circuit for the apparatus shown in FIG. 4.

Figure 4:
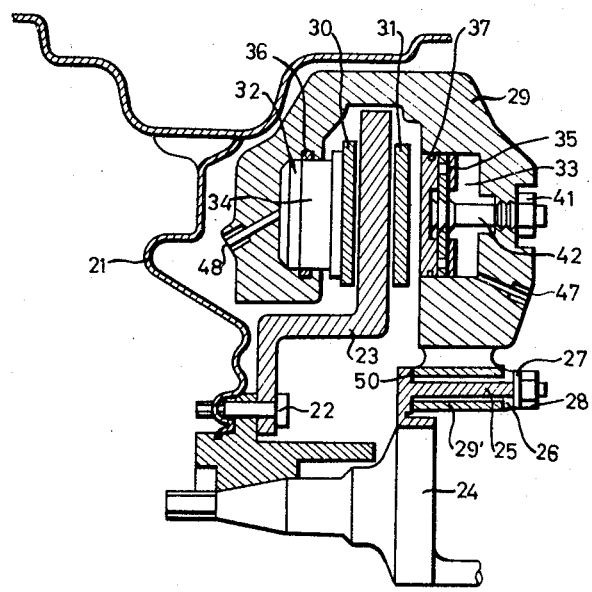
FIGURE 4 is a sectional side view of a modified form of the disc brake according to the present invention showing a part of the vehicle wheel.

Referring to the drawings, FIG. 1 shows the brake apparatus and its manner of connection in a diagrammatically illustrated braking system, in which a brake disc is rigidly mounted while a U-shaped brake lining supporting yoke is slidably mounted. In FIG. 1, the reference numeral 1 designates a brake disc carrying member, 2 is the yoke, and 3 the yoke holder which is rigidly mounted on a housing (not shown), and the yoke 2 is slidably mounted on the holder 3. The legs of the yoke 2 are provided with cylinders 4a and 4b opposed to each other on opposite sides of the brake disc 8 in symmetrical position as shown. In said cylinders 4a and 4b, there are inserted pistons 5a and 5b respectively, and at the open ends of the cylinders there are secured linings 6a and 6b facing the brake disc 8. Said cylinders 4a and 4b are connected by means of conduits 7a and 7b to two ports 9 and 10, respectively, of a master cylinder 11 as shown in FIG. 3.

In the embodiment shown in FIG. 2, the arrangement is substantially same as in the embodiment of FIG. 1, the only difference being in that in FIG. 2 the brake lining supporting yoke 2 is rigidly mounted while the brake disc 8 is axially slidable relative to a shaft 12.

The operation of the present invention will be described as follows: When the dual system oil pressure circuits are in the normal condition, the pistons 5a and 5b press the linings 6a and 6b against the brake disc 8, effecting a normal braking action. Should however any trouble or failure occur in any one of the oil pressure circuits, for instance, in the conduit 7a, only the piston 5b supplied through the conduit 7b will press the lining 6b against the brake disc 8. In such event, in FIG. 1, because the yoke 2 is slidable relative to the holder 3, the balance of the oil pressure will be broken, and the oil pressure only in the conduit 7b will become effective and will press the lining 6b against the brake disc 8. Under this circumstance, by the reaction of said oil pressure the yoke 2 will be moved in the direction of arrow A, so that the lining 6a will be pressed against the disc 8. Thus, according to this invention, a braking action of substantially the same magnitude can be attained as if the dual system oil pressure circuits were in good order. It will be seen that in the embodiment shown in FIG. 2 the same braking effect will be attained, since the brake disc 8 is axially slidable relative to the shaft 12. It is to be understood that the above mentioned manner of operation is also applicable when any trouble or failure occurs in the conduit 7b.

Figure 5:
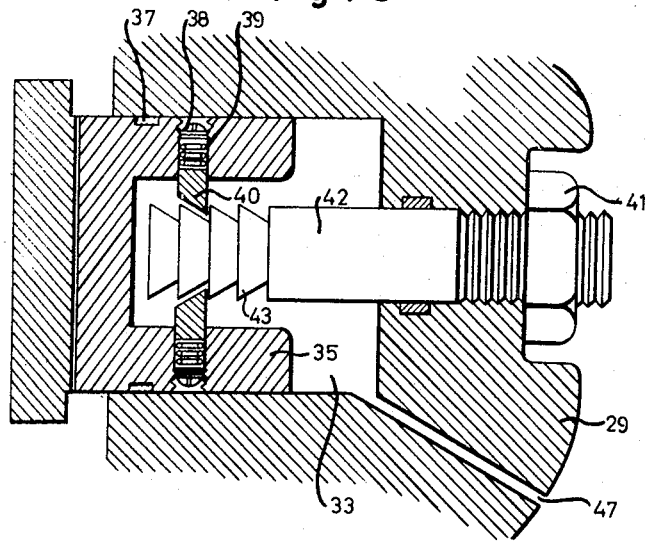
FIGURE 5 is a sectional view on an enlarged scale of a part of the righthand piston portion of FIG. 4.

Now, referring to FIGURES 4, 5 and 6, showing a modified form of the brake apparatus, the reference numeral 21 designates a member adapted to rotate in unison with the vehicle wheel, and 23 is a brake disc affixed to said member 21 by means of a plurality of anchor bolts 22. Upon the peripheral portion of a non-rotatable member 24 of the vehicle, there are secured two or more longitudinal members 25. A brake lining supporting yoke 29 has two or more base portions 29', each being axially slidably mounted on said longitudinal member 25 such as by means of a spring 26, a washer 27 and a nut 28. On opposite sides of the brake disc 23, there are provided in the yoke 29 oil pressure responsive mechanisms which are adapted to move the linings 30 and 31 into frictional contact with the faces of the brake disc 23. Said oil pressure responsive mechanism in the lefthand leg of the yoke 29 comprises a small diameter axial bore 32 having inserted therein a slidable small diameter piston 34. 36 is a packing for maintaining the oil seal. The oil pressure responsive mechanism in the righthand leg of the yoke comprises a larger diameter axial bore 33 having inserted therein a slidable larger diameter piston 35. 37 is a packing for maintaining the oil seal. In said larger diameter piston 35, there are provided two or more ratchet pawls 40, each of which is movably supported by means of a blind plug 38 and a spring 39, as best shown in FIG. 5. Said ratchet pawls 40 are in engagement with the ratchet teeth 43 formed on a pin 42, the other end of which pin is thread fitted to the yoke 29 by means of a lock nut 41. The small diameter bore 32 and the larger diameter bore 33 are provided with oil ports 48 and 47 respectively, for supply of oil pressure through independent oil conduits 45 and 46 respectively, from a dual system master cylinder 44, as shown in FIG. 6.

The operation of the above mentioned modified form of the brake apparatus is as follows: In the normal operation oil pressure from the dual system master cylinder 44 passes through the independent oil circuits 45 and 46 and through the oil ports 47 and 48 into the larger diameter bores 33 and the smaller diameter bore 32, so that the larger diameter piston 35 will tend to be moved leftwardly from the position shown in the drawing, while the smaller diameter piston 34 will tend to be moved rightwardly from the position shown in the drawing. At this time, as the pressure on the larger diameter piston 35 is stronger than that on the smaller diameter piston 34, the end of the said smaller diameter piston 34 is held in contact with the bottom of the smaller bore 32 at the time of braking, so that the brake apparatus will act as a single cylinder type disc brake apparatus. When the larger diameter piston 35 and the lining 31 come to the position in which the lining is in contact with the brake disc 23, the yoke 29 will be moved axially until its base portion 29' comes into contact with the root surface 50 of the longitudinal member 25, sliding along said member 25 against the action of the spring 26. Then, the effective braking action will be conducted on the linings 30, 31 and the brake disc 23. When the oil pressure is released, the yoke 29 is returned to its initial position by the action of the spring 26, and the frictional contact of the linings 30, 31 and the brake disc 23 will be released, so that the braking action is stopped.

If any trouble or failure occurs in the oil duct 45 leading to the smaller diameter bore 32, only the braking action by the smaller piston 34 will be reduced, but there will be no danger of losing the braking effect entirely. When there occurs any trouble or failure in the oil duct 46 leading to the larger diameter bore 33, the smaller piston 34 will be moved in the smaller bore 32 rightwardly in the drawing, bringing the lining 30 into contact with the brake disc 23. Then, the yoke 29 tends to be moved leftwardly in the drawing. At this time, however, the ratchet pawl 40 in the larger diameter piston 35 engages with the ratchet teeth 43 of the pin 42, so that the power from the piston 35 will be transmitted through said ratchet pawl 40 to the lining 31, and it causes an increase of the force causing frictional contact of the other lining 30 and the brake disc 23, thereby obtaining the desired braking action. When the oil pressure for the smaller bore 32 is released, the smaller piston 34 returns to its initial position and thereby the braking action will be stopped. In the apparatus shown in FIGS. 4 and 5, the ratchet pawl 40 and the ratchet teeth 43 of the pin 42 will aid in appropriately adjusting the clearance between the brake disc 23 and the lining 31 in case of wear of the latter. In the normal operation, the pawl 40 reciprocates within the range of the width of one tooth of the ratchet teeth 43. In case of substantial wear of the brake linings 30 and 31 and of the brake disc 23, the pawl 40 will be moved into engagement with the next tooth of the ratchet teeth 43, so that the brake clearance will be automatically adjusted.

From the foregoing, it will be understood that in the brake apparatus shown in FIGS. 4, 5 and 6, even when there occurs any trouble or failure in the oil duct leading to one of the larger piston and the smaller piston, safe braking action may always be effected without causing any decrease of brake effect, and that the clearance adjustment for compensating wear of the brake lining may readily and automatically be effected.

What I claim is:
1. A disc brake apparatus for a vehicle, comprising a brake disc, a yoke having portions on each side of said disc, an oil pressure responsive mechanism on each portion of said yoke and positioned symmetrically with respect to said brake disc, each oil pressure responsive mechanism consisting of a piston in a cylinder bore in the respective yoke portion, one of the pistons and bores having a smaller diameter than the other piston and bore, linings mounted on said pistons and positioned on opposite sides of said brake disc, a master cylinder and two oil pressure circuits, each of said oil pressure circuits being independently connected between said master cylinder and a respective cylinder bore, said yoke and brake disc being movable relative to each other in the direction of the axis of said brake disc and spring means biasing the movable one of the brake disc and yoke toward the other in a direction to move the brake disc and larger piston toward each other, and ratchet and pawl means associated with said larger piston and cylinder for blocking movement of said piston into said bore after the piston has moved a predetermined distance out of the bore, whereby when the circuit to the smaller piston and bore fails the larger piston will force the two linings against the disc by relative movement of the yoke and disc, while when the circuit to the larger piston and bore fails, the smaller piston will force the two linings against the disc by relative movement of the yoke and disc by moving the lining thereon against the disc and the disc against the larger piston which is blocked from moving away from the disc by the ratchet and pawl means.

2. A disc brake apparatus for a vehicle, comprising a brake disc, a yoke having portions on each side of said disc, and oil pressure responsive mechanism on each portion of said yoke and positioned symmetrically with respect to said brake disc, each oil pressure responsive mechanism consisting of a piston in a cylinder bore in the respective yoke portion, one of the pistons and bores having a smaller diameter than the other piston and bore, linings mounted on said pistons and positioned on opposite sides of said brake disc, a master cylinder and two oil pressure circuits, each of said oil pressure circuits being independently connected between said master cylinder and a respective cylinder bore, said yoke and brake disc being movable relative to each other in the direction of the axis of said brake disc, and an automatic brake clearance adjusting means provided in one of the cylinder bores and consisting of a pin projecting into the bore and having ratchet teeth thereon and at least one spring loaded ratchet pawl projecting into the bore transversely of the pin and engaging said ratchet teeth.

References Cited

UNITED STATES PATENTS 2,951,561    9/1960    Davis.
3,156,325   11/1964    Taylor.
3,337,009    8/1967    Meier.

FOREIGN PATENTS 998,430    7/1965    Great Britain.

GEORGE E. A. HALVOSA, *Primary Examiner.*

U.S. Cl. X.R.

188—196